April 10, 1928.
O. P. NOISOM
1,665,715
COMPASS INDICATOR FOR AUTOMOBILES, ETC
Filed May 8, 1926
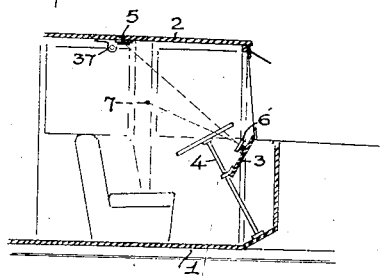
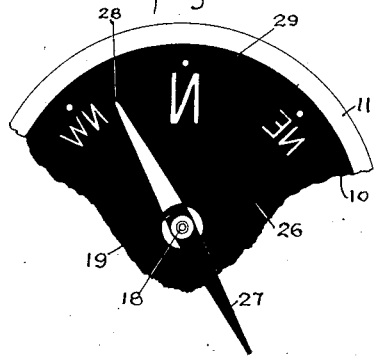
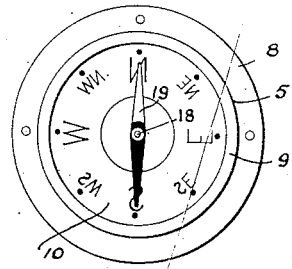
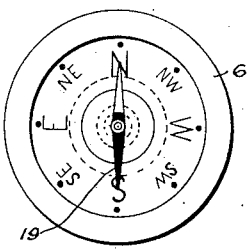
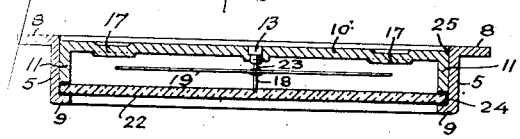
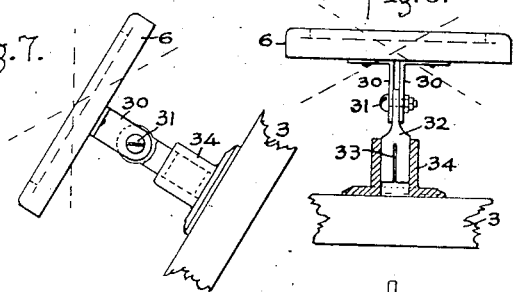
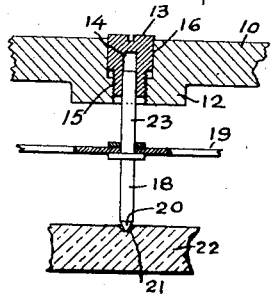
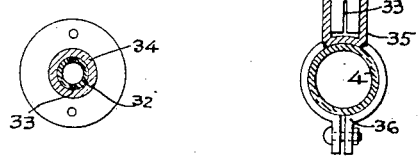
Ole P. Noisom Inventor
By H. S. Amstutz
Attorney Patented Apr. 10, 1928.

1,665,715

UNITED STATES PATENT OFFICE.

OLE P. NOISOM, OF SOUTH BEND, INDIANA.

COMPASS INDICATOR FOR AUTOMOBILES, ETC.

Application filed May 8, 1926. Serial No. 107,566.

My invention relates to improvements in compass indicators for automobiles, etc., and it more especially consists of the features pointed out in the claims.

The purpose of my invention is to provide a direction indicating compass that is located in an inverted position above the driver; that enables the driver to read the compass indications on a mirror positioned in front of him which mirror is mech. ically detached from the compass; that uses a reversed dial in the compass, nominally readable in the mirror; that uses a cooperating mirror placed on the steering column or the dash of the car; that utilizes the glass cover of the compass case as a jewel bearing for the compass needle when the inverted case is mounted against the ceiling; and that combines an integrally formed casing with a contrasting dial in which the background is dark, the indications white, polished or luminous and the directing end of the needle is also white.

With these and other ends in view, I illustrate in the accompanying drawing such instances of adaptation as will disclose the broad underlying features of my invention without limiting myself to the specific details shown thereon and described herein.

Figure 1 is a diagrammatic elevation of my device applied to an automobile.

Fig. 2 is a bottom plan view of a compass.

Fig. 3 is an enlarged detached plan view of a portion of a compass dial, its needle and some of the indications, Fig. 4 is a front elevation of the mirror with the reflections of Fig. 2 indicated thereon.

Fig. 5 is an elevation in section of the compass.

Fig. 6 is an enlarged elevation in section of the compass needle pivot.

Fig. 7 is a side elevation of a mirror attached to a dash.

Fig. 8 is an elevation of the mirror at right angles to Fig. 7, the support being shown in section.

Fig. 9 is a plan view in section of the mirror support.

Fig. 10 is an elevation in section of a mirror support attached to the steering column.

In practically carrying out my invention I may use alternative forms, materials, modified dimensions, etc., as the exigencies of actual practice demand without departing from the spirit of my invention.

Compass direction indicators for vehicles have heretofore secured the mirror to the compass by mechanical means—an extended arm—which obstructed the easy getting in and out of the driver from the vehicle seat. This form of construction also made it very difficult to properly hold the mirror in optical relation to the compass because of the very long extension of the connecting arm which supported the mirror from the compass casing. This type of indicator is shown and described in my Patent No. 1,388,292, of August 23, 1921.

In my present improved form of vehicle direction indicator I secure the compass 5 on the underside of the vehicle top 2 which forms a part of the vehicle body 1. The mirror 6 may be fastened to the dash 3, also a part of the body, shown in Figs. 1 and 7, or to the steering column 4 shown in Fig. 10. The approximate position of the driver's eye is indicated by the numeral 7, in Fig. 1.

Heretofore it has been the practice to print the compass dials on paper and cement them fast to the compass casing. This practice has proven unsatisfactory for the reason that even with unusual precautions in production the paper dials frequently become separated from the casing, which of course puts the compass entirely out of commission. Nothing can be done with it but return it to the maker to be repaired. I entirely avoid this very serious defect by forming the dial indications as an integral part of the casing so that there is no possible chance of the previously indicated trouble arising. The casing I have exemplified in the accompanying drawing comprises only two main portions, a ring or outer casing 5 and an inner casing 10. The outer casing 5 has a fastening flange 8 and a narrow glass retaining flange 9 formed thereon while the inner casing 10 has an annular flange 11 formed thereon. This flange engages the body 5 of the outer casing frictionally. It also serves to hold the glass cover 22 in place against the flange 9 of the casing 5. If desired any cooperating form of cushioning 24 may be placed between the glass 22 and the metal portions of the casing. The dial casing 10 has a boss 12 formed at its center and it has the indications 17 raised so as to stand out from the flat portion of the casing 10.

The compass needle 19 is secured to a spindle in any desired manner. The lower end 18 of such a spindle at 20, is cone shaped. It rests in a conical depression 21 formed on the upper surface of the glass cover 22. The upper end 23 of the spindle 18 enters a central hole in the retaining screw 13. The screw 13 has a threaded portion 15 and a cylindrical portion 16 which serves to hold the spindle 18 in proper axial alignment independently of the threaded portion 15, thus aligning both ends of the spindle simultaneously in case a plain cover glass is used without a conical recess 21. There is a clearance 14 above the spindle end 23 which insures that the pivot spindle 18 will always be free to rotate under the direction of the needle 19. There can be no risk of jamming the spindle when screw 13 is assembled. In order that the upper end of the screw 13 may be located below the attaching surface of the flange 8, the flange 11 of the casing 10 is made narrow enough so that when the casing 10 is pressed into the casing 5 its full extent there will be a clearance 25 between the upper face of the flange 8 and the upper surface of the casing 10.

The mirror 6 is attached to two angle brackets 30 that are spaced apart, as shown in Fig. 8, so as to receive the flattened portion of the supporting stem 32 between them. These angle pieces and the flattened portion of the supporting stem 32 are pivoted to each other by a clamping screw 31. The supporting stem 32 is slotted at 33 so as to make frictional contact with the tubular portion of the base 34. As shown in Figs. 7 and 8, the mirror is attached to the dashboard 3. When it is desired to attach the mirror to a steering column a support 35 may be used. This support 35 may be made as long as necessary so as to raise the mirror high enough so that the image in the mirror can be seen from the point 7 on the optical axis passing between the spokes of the steering wheel. It has a clamp 36 by means of which it can be adjustably secured to the steering column 4.

The outstanding feature of my invention is the forming of the dial indications integrally with the casing 10 and coating the background of the dial black, as indicated at 26 of Fig. 3; the face of the indications 17 white, as indicated at 29 of the same figure; the North seeking end of the needle white, as indicated at 28; and the South seeking end of the needle black, as shown at 27 of Fig. 3. By reason of this arrangement of contrasting indications the direction that the vehicle is travelling is instantly seen by means of the reflection in the mirror 6. In short, to whatever portion of the compass indications the white end of the needle points that is the direction the vehicle is standing in or is moving toward which is adapted from the printed instructions supplied with each compass:—The letter that is adjacent the white end of the needle will show exactly the direction in which the car is headed. For example, if traveling east the white end of the needle points to "E"; then if the car is headed southeast the white end of the needle points to "S. E."; if headed west the same end of the needle points to the designation "W"; etc. Each and every change in direction of the car is shown by the letter to which the white end of the needle points. In attaching the compass to the vehicle top it is only necessary to make sure that the "N" is pointing directly toward the front end of the vehicle.

My direction indicator may also be used at night time through the cooperation of an electric lamp 37 placed so that its direct rays fall on the compass 5 but are shielded from the mirror 6. In this way only the reflection from the dial will fall on the mirror 6 and be visible from the approximate position of the point 7.

The indications of the dial and the white portion of the needle may also be made visible for night driving by means of any kind of luminous paint.

It is of course understood that I do not limit the use of my direction indicator to automobiles but it may also be applied with equal efficiency to any form of moving conveyances such as trucks, lorries, moving vans, motor boats, etc.

A conical bearing for the lower end of the needle spindle may be formed in proper alignment with the seat for the screw 13 by means of any well known diamond tool (not shown), held in alignment with the needle axis while guided by the unthreaded portion of the casing 10, for the unthreaded part 16 of the pivot screw 13, shown in Fig. 6. This form of a spindle bearing on the inner face of the glass cover substantially constitutes a "jewelled" bearing that reduces the friction of the spindle to a minimum.

I do not of course limit myself to the use of a lamp 37, for it is obvious that in order to produce an illuminated dial any alternative expedient may be used.

The inner face of the entire casing 10 may be blackened in any suitable manner so as to contrast with the indications, whether the indications be formed as raised contrasting surfaces, as apertures in the casing or as transparent or luminous portions of the casing. For night driving it is obvious that one form or another form of illumination is desirable; however, so far as the service of the indications to the driver is concerned it is only essential that they be reflected to the driver in unreversed order regardless of the specific means used for making the indications visible.

As instanced in the drawing the outer casing 5 and the inner casing 10 are formed as stampings from sheet metal. This construction produces a very light weight mounting for the compass. However, I do not limit myself to this sheet metal type of construction. The casing of the mirror 6, may if desired, be similarly formed.

What I claim is:

1. In direction indicators, a two part casing, a glass covering supported between the two parts of the casing, a magnetic needle pivotally positioned between the casing and the glass cover, and impressed indications on the casing.

2. A compass comprising a casing, a glass cover positioned on the underside of the casing, a magnetic needle, a pivot spindle for the needle, adjustable means in the casing for the pivot adapted to axially align both ends of the pivot simultaneously, and visible indications on the casing cooperating with the needle.

3. In direction indicators, a casing attachable to the underside of the top of a moving conveyance, a series of cardinal compass indications within the casing and visible from below such indications being light colored in sharp contrast to the darker adjacent portions of the casing, means for securing the casing with its "N" indication pointing toward the forward end of the conveyance, a glass cover for the casing, and a magnetic needle resting on the cover glass and free to move between the casing and the cover the North seeking end of the needle being entirely light colored and the South seeking end being of a contrasting color similar to the darker part of the casing.

4. In direction indicators for conveyances, a suitable casing having a flanged edge integral therewith, a double flanged ring for the casing, a cover glass between a flange of the ring and the flange of the casing, a magnetic needle free to rotate between the glass and the casing on its axis, a removable bearing recess in the glass for the lower end of the axis, and means for simultaneously holding the axis free to rotate and have slight endwise movement.

In testimony whereof I affix my signature.

OLE P. NOISOM.

DISCLAIMER 1,665,715.—*Ole P. Noisom*, South Bend, Ind. COMPASS INDICATOR FOR AUTOMOBILES, etc. Patent dated April 10, 1928. Disclaimer filed March 6, 1931, by the patentee.

Disclaims from the scope of said claim "a removable bearing recess in the glass for the lower end of the axis", and limits the scope of said claim to the structure of an inverted compass having a cover glass on its under face, above which a compass needle is fixedly secured to a spindle or axis, which axis at its lower end has bearing in a recess formed on the upper face of the cover glass, and is free to rotate in said recess while the upper end of the axis is free to rotate and have slight endwise movement in an upper bearing, such endwise movement being limited by the distance the upper bearing is separated from the cover glass.

[*Official Gazette March 24, 1931.*]